July 6, 1926.
M. L. STWALLEY
FOLDING AUTOMOBILE CRIB
Filed August 20, 1923
1,591,571
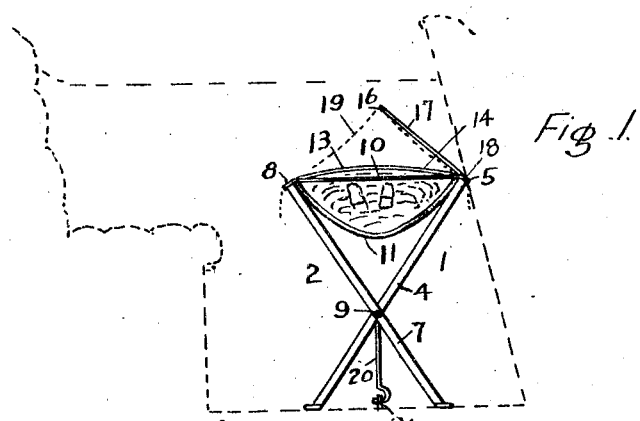
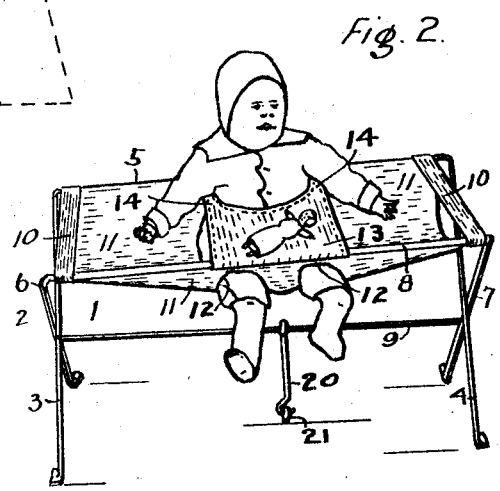
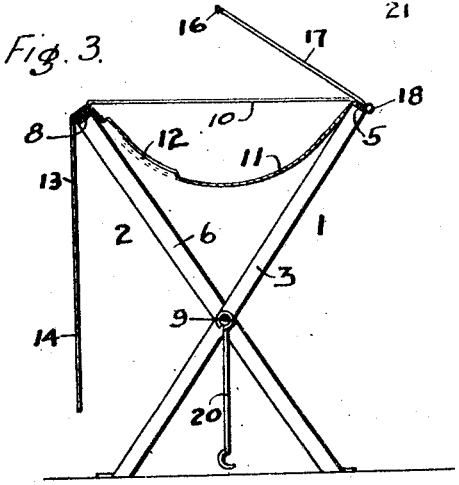
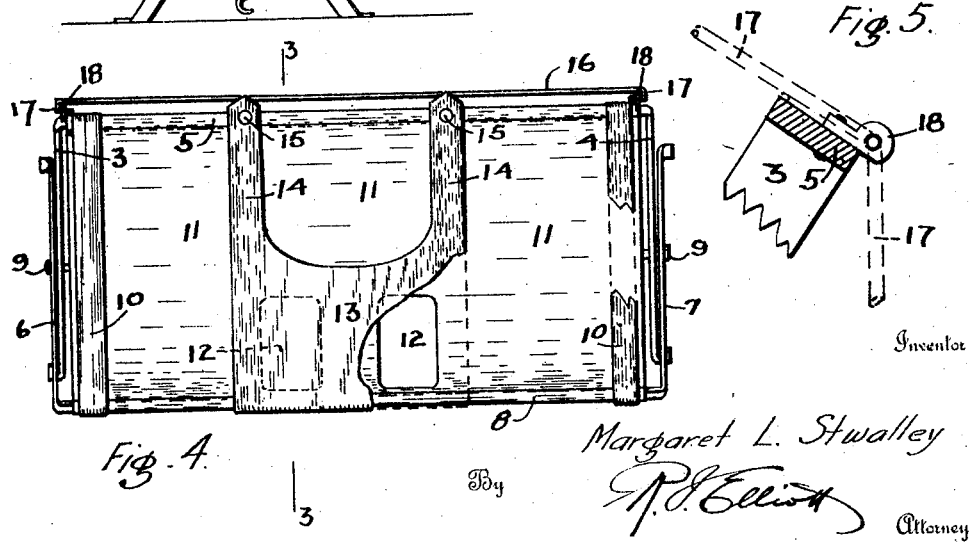
Inventor
Margaret L. Stwalley
By
R. J. Elliott
Attorney Patented July 6, 1926.

1,591,571

UNITED STATES PATENT OFFICE.

MARGARET L. STWALLEY, OF TACOMA, WASHINGTON.

FOLDING AUTOMOBILE CRIB.

Application filed August 20, 1923. Serial No. 658,365.

This invention relates to devices in which to securely place a small child in an automobile, and has for its objects to provide a crib which is removable from the automobile and which may be used in other places as desired; which can be folded up to occupy very little space when not in use; which may be securely held in place when in use; which provides a comfortable and sheltered support for the child; in which the child may be securely and yet comfortably held either in reclining or sitting position; and which is cheap and easy to make and operate, and effective and safe to use.

I attain these and other objects by the devices and arrangements illustrated in the accompanying drawings, in which Fig. 1 is an end elevation of the crib showing it in position in an automobile and the child in reclining position; Fig. 2 is a perspective view showing the child in sitting position; Fig. 3 is a cross-section on the line 3—3 in Fig. 4; Fig. 4 is a plan of the crib; and Fig. 5 is a section of the rear horizontal member of the frame, showing the connection of the netting frame with said rear member.

Similar numerals of reference refer to similar parts throughout the several views.

It has been a difficult problem for parents to know how to place the baby or small child in an automobile so that they will be safe and comfortable and yet not need constant attention or care. For this purpose I have devised the following crib which may also be used in the home, the tent, or in any other place desired, and which will securely hold the child in either reclining or sitting position.

Referring to the drawings it will be seen that the crib is formed with a pair of similar frames 1 and 2 pivoted together and forming the four legs and two horizontal members of the crib. The inner frame 1 has its two ends 3 and 4 bent at right angles to the central part 5 which forms the rear horizontal member of the crib, while the parts 3 and 4 form two of the legs of the crib. The frame 2 also has its two ends 6 and 7 bent at right angles to the central part 8 which forms the front horizontal member of the crib, while the said parts 6 and 7 form the other two legs of the crib. The part 8 is slightly longer than the part 5 so that the two legs 6 and 7 lie outside of the two legs 3 and 4. A pivot rod 9 passes through holes in all the legs 6, 3, 4 and 7 and is riveted at its ends and forms a lower brace to the legs and yet permits the pairs of legs 6 and 3, and 4 and 7, to turn so that the frame members 5 and 8 can be brought together or opened apart. The frames 1 and 2 are preferably made of flat metal bars, say about three-sixteenths of an inch thick by three-quarters of an inch wide, bent as shown and also have their extreme ends bent to lie flat on the floor when in use.

Two straps 10 are fastened at each end to the members 5 and 8, one at each end thereof, and prevent the parts from opening too wide apart.

A fabric bed or seat or support 11 is also hung from the two members 5 and 8 and extends from end to end thereof. This fabric 11 is longer than the said straps 10 and thus hangs down loosely between said members 5 and 8 to form the trough of the crib on which the child is placed, either in reclining or sitting posture. Two separated leg holes 12 are formed in said fabric 11, each extending from near the center towards the front member 8, said leg holes being adapted to permit the child's legs to pass therethrough when it is sitting on the fabric with its back to the rear member 5 of the crib.

An apron or bib is permanently fastened to the front member 8 and has its front portion 13 in a single unbroken surface adapted to act as a table for toys, food, etc., when the child is sitting up as above, while its rear portion is formed of two straps 14 which are removably secured to the rear member 5 by buttons 15 or similar simple attaching means. These two straps 14 pass on each side of the child, under its arms, and hold the apron in place over the legs of the child, when sitting up, and may also be used to hold the child down in the crib when it is recumbent.

In order to protect the sleeping child from insects I have provided a third frame, preferably made of round metal rod, having a central longitudinal horizontal part 16 and two end arms 17 at right angles thereto, said arms 17 being bent at their extreme ends at right angles to pass through holes in the lugs 18 secured to the rear member 5, as shown in Fig. 5. These lugs 18 are so positioned that when the netting frame is not in use the arms 17 may be turned in the lugs and the frame is swung down into vertical position at the back of the crib, while when it is in use, the said arms rest on the member 5 which holds them up and the part 16 is then substantially over the center of the crib. A suitable netting 19 may then be thrown over the frame 16 and the crib.

Though in ordinary use, on good roads, I find that the crib does not need to be secured in place in the automobile yet when travel is rough I perceive that it might be well to secure it in place and I have therefore provided a hook 20 depending down from the pivot rod 9 and adapted to engage a screw-eye 21 located in the floor of the automobile or the room in which the crib may be used.

Thus it will be seen that this crib may be folded away into small space, and may be set up and securely fastened in any place where it is to be used; that the child is held firmly either in reclining or sitting position; that the child has a table for its playthings in front of it when sitting up; and is protected from insect bites when recumbent.

Having described my invention, what I claim is:—

A folding automobile crib comprising a frame having two side members and end legs; a fabric support loosely hung from both said side members to form a trough whose axis is parallel with said side members, said fabric having two leg holes cut therein, both positioned to one side of its axis; and an apron permanently attached to one said side member, adjacent and above said leg holes, and formed with two end straps, with open space between, said straps being adapted to be removably secured to the other side member, said apron having its axis of symmetry lying across the axis of the trough, whereby said apron is adapted to hold the child in said trough in reclining position parallel with the axis of the trough and in sitting position at right angles to the axis of said trough.

MARGARET L. STWALLEY.